United States Patent [19]

Lambie

[11] 4,265,457
[45] May 5, 1981

[54] SHAFT SEALS

[75] Inventor: John W. Lambie, Kilmarnock, Scotland

[73] Assignee: Neptune Glenfield Limited, Kilmarnock, Scotland

[21] Appl. No.: 84,064

[22] Filed: Oct. 12, 1979

[30] Foreign Application Priority Data

Feb. 14, 1979 [GB] United Kingdom ............... 05276/79

[51] Int. Cl.³ ..................... F16K 41/16; F16K 43/00; F16J 15/26
[52] U.S. Cl. ................................... 277/105; 277/115; 277/117; 277/173; 277/190; 277/198; 251/128; 251/214; 251/326
[58] Field of Search .................... 251/128, 214, 326; 277/102, 103, 105, 115, 116.2, 117, 119–120, 173, 174, 189, 177, 190, 198, 199

[56] References Cited

U.S. PATENT DOCUMENTS

| 2,511,260 | 6/1950 | Heinrich | 277/115 X |
| 2,842,336 | 7/1958 | Johnson | 277/173 X |
| 2,935,365 | 5/1960 | Dega | 277/173 X |
| 3,399,862 | 9/1968 | Cerow | 251/214 |

FOREIGN PATENT DOCUMENTS

| 154924 | 10/1904 | Fed. Rep. of Germany | 277/105 |
| 726350 | 3/1955 | United Kingdom | 277/105 |
| 1117815 | 6/1968 | United Kingdom | 251/214 |

Primary Examiner—Robert S. Ward, Jr.
Attorney, Agent, or Firm—Larson, Taylor and Hinds

[57] ABSTRACT

A shaft seal incorporates a casing formed with a stepped bore both diameters of which are greater than the diameter of the shaft fitted to the bore. A bearing sleeve fitting the shaft is located in the smaller diameter portion of the bore. A seal-carrying ring held captive within the larger diameter portion of the bore is formed to support at each end a sealing ring in contact with the shaft and a sealing ring located between the outer surface of the ring and the casing.

6 Claims, 2 Drawing Figures

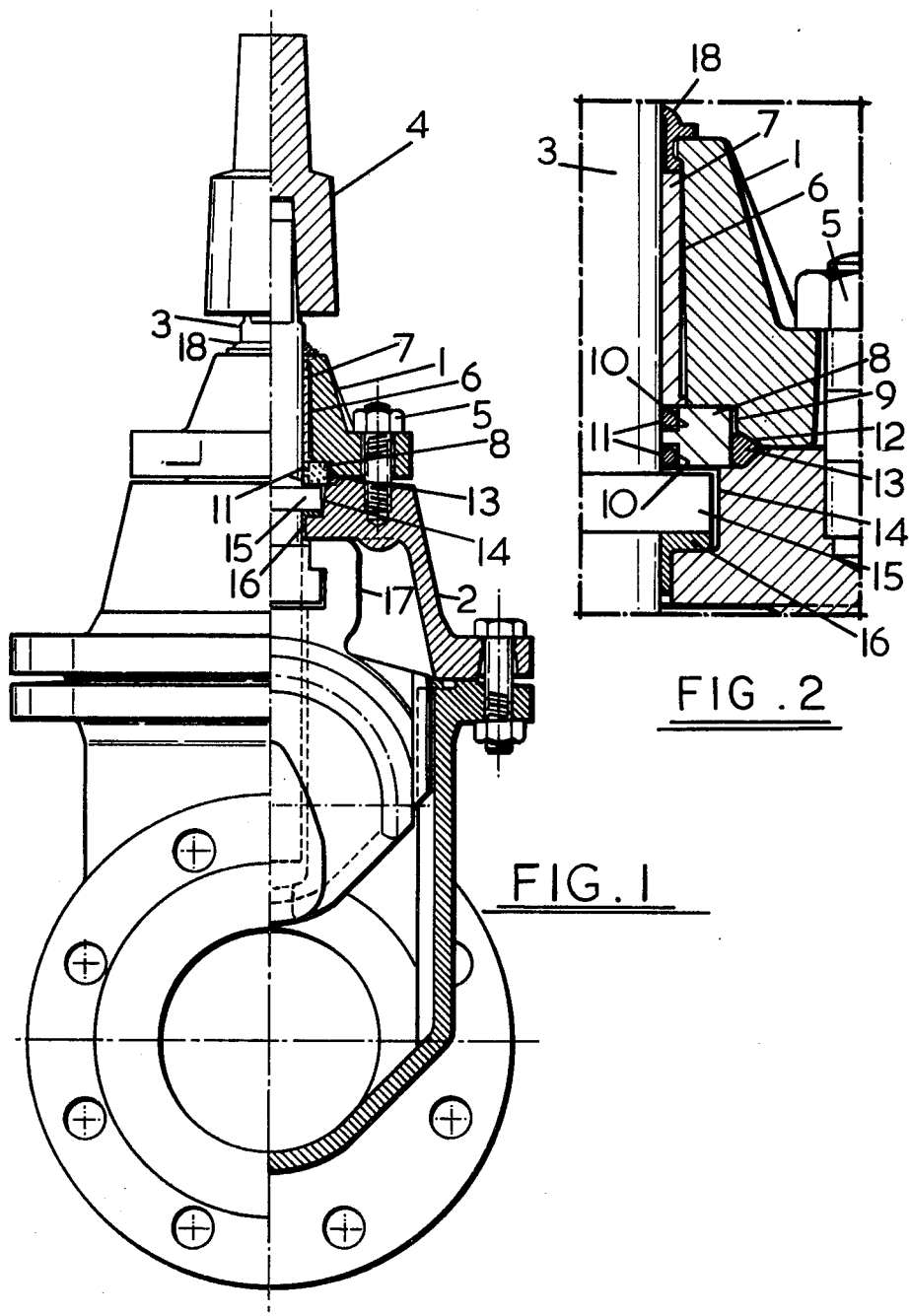

SHAFT SEALS

The subject of this invention is a shaft seal and is particularly appropriate for sealing the operating shafts of large valves for controlling the flow of fluid under pressure.

In any installation incorporating an operating shaft, particularly an operating shaft which has to be rotated by hand and which must be sealed against leakage of pressure fluid, it has been customary to provide a seal consisting of a number of sealing rings which encircle the shaft and are held in an annular space formed in a casing surrounding the shaft. In such an installation it is easy for severe sideward thrusts to be exerted on the shaft during operation because although the usual device for operating the operating shaft of a valve, for example, is a hand wheel the operator will frequently either pull the wheel around using one hand or will apply unequal force to different parts of the wheel. In either case an unbalanced couple is applied to the shaft tending to cause the shaft to be bent. To resist the sideward force journal bearings are often combined with the seal. The whole installation can be quite expensive and when renewal is necessary it can be difficult to replace.

It is an object of the present invention to provide a seal which is cheap to make, takes up little space and is easily renewable.

A shaft seal according to the invention incorporates a casing formed with a stepped bore having a small diameter portion extending from one end of the casing, the diameter of said portion being greater than the diameter of the shaft to be sealed, and a large diameter portion extending from the other end of the casing, a bearing sleeve arranged to fit the shaft held against rotation within the smaller diameter portion of the bore, a seal-carrying ring contained within the larger diameter portion of the bore, each end face of the ring being formed with an annular notch which penetrates some distance along the inner surface of the ring, a resilient sealing ring contained in each notch and a resilient sealing ring located between the outer surface of the ring and the casing.

The sleeve and the seal-carrying ring may be formed integrally with one another.

The end of the small diameter portion of the bore remote from the large diameter portion of the bore may be fitted with a dirt-excluding ring.

The invention also consists of a shaft seal as described in combination with a body member to which the casing is attached as a cover over an opening providing access to the interior of the body member, said opening being formed with a counterbore on the face of the body member adjacent the casing, an operating shaft passing through the casing and the opening in the body member, said shaft being formed with a flange projecting into the counterbore, and a thrust ring located between the flange and the bottom of the counterbore. Said thrust ring may be L-shaped in cross section, one limb of the L being against the appropriate side face of the flange and the other limb lying along the shaft i.e. it is tubular and is coaxial with the shaft, and occupies the annular space between the body member and the shaft.

The corner between the cylindrical surface of the large diameter portion of the stepped bore in the casing and the adjacent end face of the casing may be rabbeted, i.e. notched or hollow chamfered whereby to form a recess in which a sealing ring, e.g. an O ring, may be located to seal against the outer surface of the seal-carrying ring and the casing.

A practical embodiment of the invention is illustrated in the accompanying drawing wherein FIG. 1 shows a portion of a gate valve incorporating an operating shaft and a seal, and FIG. 2 shows details of a portion of FIG. 1 on an enlarged scale.

In the drawings 1 denotes a seal-supporting casing attached to a housing 2 constituting a part of a valve body, 3 denotes the operating shaft of the valve and 4 denotes an operating handle fitted to the shaft 3. Studs 5 hold the casing 1 to the housing 2. The casing 1 is formed with a stepped bore in the small diameter portion 6 of which there is located a bearing sleeve 7 of low friction material, i.e. material which when rubbed against the surface of the shaft 2 exhibits a low coefficient of friction. The sleeve 7 is held in a manner to prevent it from turning in the casing 1, e.g. it may be keyed or held by an adhesive. A ring 8 is located within the large diameter portion 9 of the stepped bore in the casing 1. Notches 10 are formed in opposite ends of the ring 8 and penetrate some distance along the inner cylindrical surface of the ring 8. O rings 11 lie in the notches 10. The corner formed between the end face of the casing 1 adjacent the housing 2 and the cylindrical surface of the large diameter portion 9 of the stepped bore in the casing is rabbeted at 12 and the recess thus formed contains an O ring 13. In the construction illustrated the housing 2 is notched to accommodate a portion of the ring 8 and the O ring 13. The housing 2 is formed with a counterbore 14 and the shaft 3 is formed with a flange 15 located within the counterbore 14, an L-shaped ring 16 being fitted between the bottom of the counterbore 14 and the flange 15 so that one limb of the L-shaped ring 16 is between the bottom of the counterbore 14 and the adjacent side faces of the flange 15 and the other limb of the L-shaped ring 16 is coaxial with the shaft 3. 17 denotes a valve member movable across a passage through the valve body and partly into the housing 2, said member 17 being entrained by the shaft 3. 18 denotes a dirt cover preventing the ingress of foreign matter to the bore in the casing 1.

In practice, when the shaft 3 is being rotated to change the position of the valve member 17 the flange 15 acts as a thrust member and presses either against the ring 8 or against the L-shaped ring 16 depending on whether the valve is being opened or closed. Fluid cannot leak from the interior of the valve body along the shaft 3 to the exterior because any fluid which managed to get past the L-shaped ring 16 is arrested by the O-rings 11 and 13. When the valve is being opened or closed any sideward thrust on the shaft 3 causes the shaft 3 to press against the sleeve 7 which supports the shaft 3 and resists the force tending to bent the shaft 3. If the O rings should become worn and require replacement they can be replaced while the valve is actually in service under pressure by rotating the shaft 3 until the valve member 17 comes to the open position whereupon the valve member in being pressed against the top of the housing 2 causes the flange 15 to be pressed against the bottom of the counterbore 14 thus providing a tight seal between the radially extending limb of the L-shaped ring 16 and the flange 15 and the housing 2. The nuts on the studs 5 may then be removed permitting the casing 1 to be lifted off without allowing any leakage to occur from the valve. With the casing 1 removed the ring 8 may be removed and the O rings 11 and 13 replaced. Also if necessary the sleeve 7 may be replaced. When the necessary parts have been replaced the casing 1 is re-applied to the valve body by fitting it over the end of the shaft 3 and the nuts tightened again on the studs 5. The valve member 17 may then be moved to the appropriate position by rotating the shaft 3 as necessary.

The construction of the invention provides a cheap and readily replacable seal. It requires only the special ring 8 which can be cheaply formed while the O rings 11 and 13 are cheap and readily obtainable. The sleeve 7 is a plain cylindrical sleeve presenting no difficulties of fabrication.

What is claimed is:

1. A shaft seal which incorporates a casing formed with a stepped bore having a small diameter portion extending from one end of the casing, the diameter of said portion being greater than the diameter of the shaft to be sealed, and a large diameter portion extending from the other end of the casing, a bearing sleeve arranged to fit the shaft held against rotation within the smaller diameter portion of the bore, a seal-carrying ring contained within the larger diameter portion of the bore, each end face of the ring being formed with an annular notch which penetrates some distance along the inner surface of the ring, a resilient sealing ring contained in each notch and a resilient sealing ring located between the outer surface of the ring and the casing.

2. A shaft seal as described in claim 1 in which the sleeve and the seal-carrying ring are formed integrally with one another.

3. A shaft seal as described in claim 1 in which the end of the small diameter portion of the bore remote from the large diameter portion of the bore is fitted with a dirt-excluding ring.

4. A shaft seal as described in claim 1 in combination with a body member to which the casing is attached as a cover over an opening providing access to the interior of the body member, said opening being formed with a counterbore on the face of the body member adjacent the casing, an operating shaft passing through the casing and the opening in the body member, said shaft being formed with a flange projecting into the counterbore, and a thrust ring located between the flange and the bottom of the counterbore.

5. A shaft seal in combination with a body member as described in claim 4 in which the thrust ring is L-shaped in cross section, one limb of the L being against the appropriate side face of the flange and the other limb lying along the shaft, said other limb being tubular and being coaxial with the shaft, and occupying the annular space between the body member and the shaft.

6. A shaft seal as described in claim 1 in which the corner between the cylindrical surface of the large diameter portion of the stepped bore in the casing and the adjacent end face of the casing is rabbeted to form a recess and a sealing ring is located in said recess to seal against the outer surface of the seal-carrying ring and the casing.

* * * * *